(12) United States Patent
Hwang et al.

(10) Patent No.: US 7,746,951 B2
(45) Date of Patent: Jun. 29, 2010

(54) LOG-LIKELIHOOD RATION (LLR) GENERATING APPARATUS AND METHOD IN MULTIPLE INPUT MULTIPLE OUTPUT (MIMO) ANTENNA COMMUNICATION SYSTEM

(75) Inventors: Keun-Chul Hwang, Seongnam-si (KR); Soon-Young Yoon, Seoul (KR); Young-Hoon Kwon, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 891 days.

(21) Appl. No.: 11/600,524

(22) Filed: Nov. 16, 2006

(65) Prior Publication Data

US 2007/0127589 A1    Jun. 7, 2007

(30) Foreign Application Priority Data

Nov. 16, 2005    (KR)    ....................... 10-2005-0109584

(51) Int. Cl.
*H04B 7/02*    (2006.01)
(52) U.S. Cl. ................. 375/267; 375/299; 375/347; 455/132
(58) Field of Classification Search ................. 375/267, 375/299, 347; 455/132
See application file for complete search history.

(56) References Cited

U.S. PATENT DOCUMENTS

| | | | |
|---|---|---|---|
| 6,594,318 B1* | 7/2003 | Sindhushayana | ............ 375/262 |
| 7,031,664 B2* | 4/2006 | Lee et al. | ................. 455/67.13 |
| 7,181,167 B2* | 2/2007 | Onggosanusi et al. | ...... 455/63.1 |
| 7,408,976 B1* | 8/2008 | Narasimhan et al. | ........ 375/148 |
| 7,433,432 B2* | 10/2008 | Hoo | .......................... 375/347 |
| 2002/0196842 A1* | 12/2002 | Onggosanusi et al. | ....... 375/148 |
| 2004/0042565 A1* | 3/2004 | Garrett | ........................ 375/341 |
| 2004/0120411 A1* | 6/2004 | Walton et al. | ............... 375/260 |

(Continued)

FOREIGN PATENT DOCUMENTS

KR    1020000021055    4/2000

(Continued)

OTHER PUBLICATIONS

Abe, "Space-time turbo equalization in frequency-selective MIMO channels", IEEE Transactions on Vehicular Technology, vol. 52, Issue 3, May 2003 pp. 469-475.*

(Continued)

*Primary Examiner*—Juan A Torres
(74) *Attorney, Agent, or Firm*—The Farrell Law Firm, LLP (57) ABSTRACT

A Log-Likelihood Ratio (LLR) generating apparatus and method in a communication system using a spatial multiplexing scheme. The reception method includes acquiring at least one estimated transmit vector by demodulating a receive vector using at least one Multiple Input Multiple Output (MIMO) detection process; selecting one of the at least one estimated transmit vector as an optimum estimated transmit vector; calculating LLRs with respect to the optimum estimated transmit vector; calculating a weight to be applied to each of elements constructing the optimum estimated transmit vector; and applying the weight to each of the calculated LLRs. Accordingly, the present invention can generate the LLRs with high reliability similar to the LLRs of a Maximum Likelihood receiver by applying the weight to the LLRs generated from the estimated transmit vector.

17 Claims, 6 Drawing Sheets

U.S. PATENT DOCUMENTS

| | | | |
|---|---|---|---|
| 2004/0165675 A1* | 8/2004 | Ito et al. | 375/267 |
| 2004/0174939 A1* | 9/2004 | Wang | 375/316 |
| 2005/0094741 A1* | 5/2005 | Kuroda | 375/267 |
| 2005/0135492 A1* | 6/2005 | Jia et al. | 375/260 |
| 2006/0029149 A1* | 2/2006 | Kim et al. | 375/267 |
| 2006/0045211 A1* | 3/2006 | Oh et al. | 375/329 |

FOREIGN PATENT DOCUMENTS

| | | |
|---|---|---|
| KR | 1020020072790 | 9/2002 |
| KR | 1020030041196 | 5/2003 |
| WO | WO 01/67617 | 9/2001 |

OTHER PUBLICATIONS

Wang, "MIMO turbo receiver with new probability data association soft interference cancellation", 2005 International Conference on Communications, Circuits and Systems, 2005, Proceedings, vol. 1, May 27-30, 2005 pp. 232-236 vol. 1.*

Kim, "An improved V-BLAST receiver based on reliability normalization", 2004 IEEE 60th Vehicular Technology Conference, 2004, VTC2004-Fall, vol. 3, Sep. 26-29, 2004 pp. 1565-1569 vol. 3.*

Garrett, "Silicon complexity for maximum likelihood MIMO detection using spherical decoding", IEEE Journal of Solid-State Circuits, vol. 39, Issue 9, Sep. 2004 pp. 1544-1552.*

Garrett, "A 28.8 Mb/s 4 ×4 MIMO 3G CDMA receiver for frequency selective channels", IEEE Journal of Solid-State Circuits, vol. 40, Issue 1, Jan. 2005 pp. 320-330.*

Davis, "System architecture and ASICs for a MIMO 3GPP-HSDPA receiver", The 57th IEEE Semiannual Vehicular Technology Conference, 2003, VTC 2003-Spring, vol. 2, Apr. 22-25, 2003 pp. 818-822 vol. 2.*

* cited by examiner

LOG-LIKELIHOOD RATION (LLR) GENERATING APPARATUS AND METHOD IN MULTIPLE INPUT MULTIPLE OUTPUT (MIMO) ANTENNA COMMUNICATION SYSTEM

PRIORITY

This application claims priority under 35 U.S.C. §119 to an application filed in the Korean Intellectual Property Office on Nov. 16, 2005 and assigned Serial No. 2005-109584, the contents of which are incorporated herein by reference.

BACKGROUND OF THE INVENTION

1. Field of the Invention

The present invention generally relates to a multi-antenna communication system, and in particular, to an apparatus and method of generating a Log-Likelihood Ratio (LLR) of high reliability in a communication system using a spatial multiplexing scheme.

2. Description of the Related Art

Recently, with rapid growth of the wireless mobile communication market, various multimedia services in the wireless environment are becoming more heavily demanded. In particular, mass transmission data and rapid data delivery are progressing. Thus, an urgent task is to find a method of efficiently using limited frequencies. To respond to this, a new transmission technique using a multi-antenna is desired. By way of example of the new transmission technique, a Multiple Input Multiple Output (MIMO) system using a multi-antenna is being used.

The MIMO technique, which uses a multi-antenna at the transmitter and the receiver respectively, can increase the channel transmission capacity in proportion to the number of the antennas without additional frequencies or transmit power allocation, comparing to a system using a single antenna. Thus, in recent years, active research is being conducted on the MIMO technique.

The Multi-antenna techniques are divided largely to a spatial diversity scheme which improves the transmission reliability by acquiring a diversity gain corresponding to the product of the numbers of transmit and receive antennas, a Spatial Multiplexing (SM) scheme which increases the data rate by transmitting a plurality of signal streams at the same time, and a combination scheme of the spatial diversity and the SM.

When transmitters send different data streams using an SM scheme of the multi-antenna techniques, interference occurs between the data transmitted simultaneously. Hence, the receiver detects a signal using a Maximum Likelihood (ML) receiver by taking account of the influence of the interference signal, or detects the signal after rejecting the interference. The interference cancellation schemes include a Zero Forcing scheme, a Minimum Mean Square Error (MMSE) scheme, and so forth. In a general SM scheme, there is the trade-off between the receiver performance and the computational complexity of the receiver. Thus, active research is conducted on a reception process which can achieve performance approximate to an ML receiver with a low computational complexity of the receiver.

In the mean time, it is known that decoding by providing a soft decision value to a channel decoder is beneficial in terms of the performance, rather than providing a hard decision value of encoded bits. A input soft decision value of the decoder, which is an estimated value of modulated symbols transmitted in the channel, uses a Log-Likelihood Ratio (LLR) value. Accordingly, a receiver of an SM scheme uses a process which generates an optimum LLR from a corresponding reception process, besides a low-complexity reception process.

Conventional signal detection methods using the SM scheme include the ML, Successive Interference Cancellation (SIC), and Vertical Bell Labs Layered Space-Time (V-BLAST), and so forth.

Figure 1:
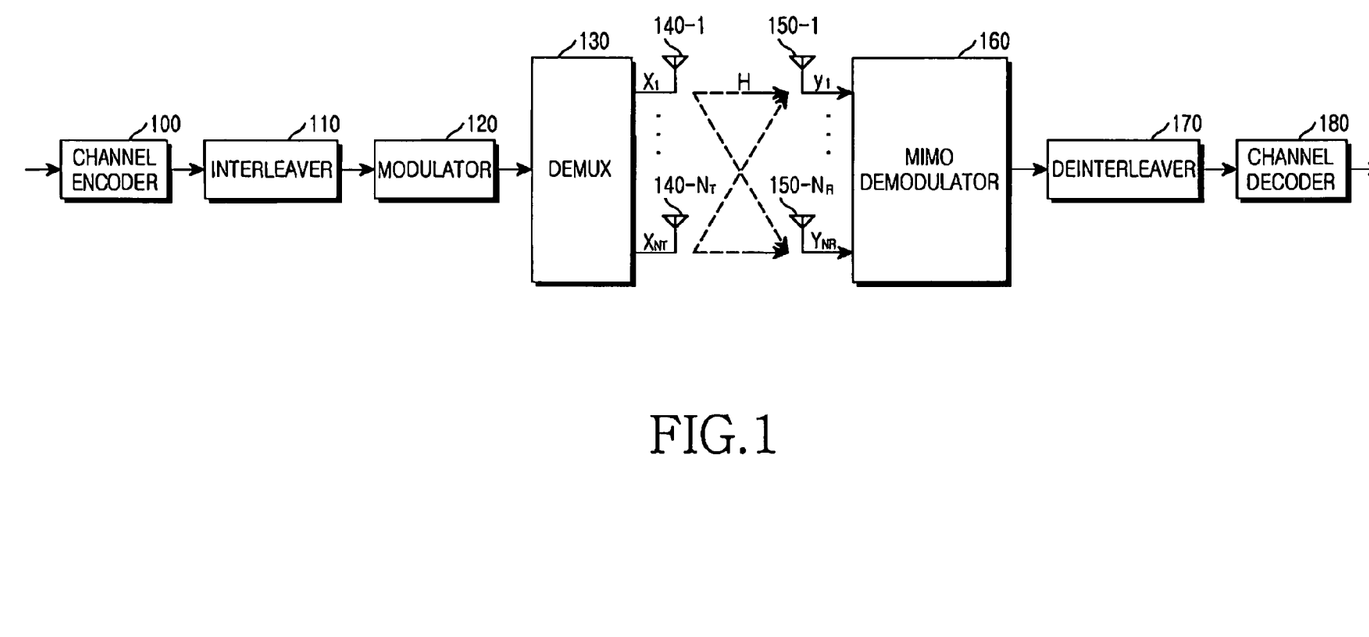
FIG. 1 illustrates a configuration of a transmitter and a receiver in a Multiple Input Multiple Output (MIMO) antenna system according to the present invention.

To briefly explain the processes, a system model is defined. The system of the interest is a model including $N_T$-ary transmit antennas and $N_R$-ary receive antennas as shown in FIG. 1. When expressing a signal to transmit on each transmit antenna as $x_m$, a receive signal y at the receiver can be expressed by Equation (1) below. It is assumed that the signal $x_m$ to transmit on the transmit antenna is an M-QAM signal. The number of the encoded bits that can be transmitted at a time is $N_T \times \log_2(M)$.

$$y = Hx + n \quad (1)$$

In Equation (1), y is a receive signal vector, x is the transmit symbol vector, and H is a channel coefficient matrix generated between the transmit antenna and the receive antenna, which is defined by Equation (2) below. n denotes an ambient Gaussian noise vector.

$$x = [x_1, x_2, x_3, \ldots, x_{N_T}]^T \quad (2)$$
$$y = [y_1, y_2, y_3, \ldots, y_{N_R}]^T$$
$$H = \begin{bmatrix} h_{11} & h_{12} & \cdots & h_{1N_T} \\ h_{21} & h_{22} & \cdots & h_{2N_T} \\ \vdots & \vdots & \cdots & \vdots \\ h_{N_R 1} & h_{N_R 2} & \cdots & h_{N_R N_T} \end{bmatrix}$$

In Equation (2), the channel coefficient matrix H is $N_R \times N_T$ matrix. The element $h_{ij}$ corresponding to the i-th line and the j-th column denotes the channel response between the j-th transmit antenna and the i-th receive antenna.

Signal detection methods using the SM scheme are arranged as follows.

The ML scheme selects a symbol vector having the shortest direct distance by computing the Euclidean distance, as defined below in Equation (3), with respect to all symbol vectors in the constellation. In other words, the ML scheme, which measures the distance between y and Hx, determines a symbol vector having the shortest distance as a symbol vector with the highest similarity, that is, with the minimum error. However, it is hard to practically realize the ML scheme because the complexity increases by raising the length of the codeword to the power of the number of the transmit antennas as shown in $M^{N_T}$(M-ary,|c|=M).

$$\hat{x} = \arg_x \min \|y - Hx\|_F^2 \quad (3)$$

The SIC scheme cancels the interference of the received signal by reconstructing the values of the hard decision at the previous step. However, if the hard decision values of the previous step suffer error, the SIC scheme aggravates the error in the next step. Thus, in every step, the reliability of the hard decision values deteriorates.

Accordingly, the SIC scheme needs to take account of error propagation which is the factor of the performance degradation. Specifically, since the decoding is performed in the order of the transmit antenna index regardless of the channel status during interference cancellation, interference cancellation is carried out without removing the transmit antenna of the great signal intensity. As a result, the performance of the transmit antenna signal with the weak signal intensity is not considerably enhanced. A V-BLAST process addresses this problem and shows the better performance than an existing SIC scheme by canceling interference in an order of transmit antennas having the greater signal intensity.

The Modified ML (MML) scheme, by ML-decoding the symbol vectors transmittable on the other transmit antennas, excluding a signal transmitted with an arbitrary transmit antenna, can determine the one signal through the simple slicing operation Q( ) as shown below in Equation (4). The MML scheme exhibits the performance similar to the ML scheme and its computational complexity increases by raising to the power of the number of the transmit antennas minus 1. That is, the ML scheme computes the Euclidean distance with respect to $M^{N_T}$-ary transmit vectors, whereas the MML computes the Euclidean distance with respect to $M^{N_T-1}$-ary transmit vectors and detects the signal of the rest symbol through the slicing operation as in Equation (4).

$$x_i = Q\left(\frac{h_i^H}{\|h_1\|^2}\left(y - \sum_{j \neq i} h_j x_j\right)\right) \quad (4)$$

Finally, the Recursive MML (RMML) scheme is suggested to far more mitigate the complexity of the MML. The RMML generates a plurality of subsystems by nulling the channel using Givens rotation and decides the MML in the minimum unit 2×2 channel. As such, the RMML scheme can mitigate the computational complexity with the performance similar to the ML by generating the subsystems (e.g., 3×3 and 2×2). Yet, the generation of the multiple subsystems implies the multiple candidate transmit vectors, which limit the complexity mitigation. In addition, since the decision is made in the 2×2 subsystem right away, the performance degradation arises like the SIC family.

Meanwhile, the LLR computation at the MIMO receiver differs depending on the reception processes. In the MIMO environment with the inter-signal interference, the reliability of the LLR value quite differs depending on the MIMO reception processes. The reliability of the LLR value directly affects the decoding performance of the decoder. In the ML receiver which is known as the optimum receiver amongst the various MIMO reception processes, the optimum LLR computation is expressed by Equation (5) below.

$$LLR_{optimum}(b_i) = \log\frac{P(b_i = +1 \mid y)}{P(b_i = -1 \mid y)} \quad (5)$$

$$= \log\frac{P(y \mid b_i = +1)P(b_i = +1)}{P(y \mid b_i = -1)P(b_i = -1)}$$

$$= \log\frac{P(y \mid b_i = +1)}{P(y \mid b_i = -1)}$$

$$= \log\frac{\sum_{x^+ \in C_i^+} P(y \mid x = x^+)P(x = x^+)}{\sum_{x^- \in C_i^-} P(y \mid x = x^-)P(x = x^-)}$$

-continued $$= \log\frac{\sum_{x^+ \in C_i^+} \exp\left(-\frac{\|y - Hx^+\|^2}{2\sigma^2}\right) \prod_{b_j \in x^+} P(b_j)}{\sum_{x^- \in C_i^-} \exp\left(-\frac{\|y - Hx^-\|^2}{2\sigma^2}\right) \prod_{b_j \in x^+} P(b_j)}$$

$$\approx \log\frac{\max_{x^+ \in C_i^+} \exp\left(-\frac{\|y - Hx^+\|^2}{2\sigma^2}\right)}{\max_{x^- \in C_i^-} \exp\left(-\frac{\|y - Hx^-\|^2}{2\sigma^2}\right)}$$

$$= \frac{1}{2\sigma^2}\left\{\min_{x^+ \in C_i^+}\|y - Hx^+\|^2 - \min_{x^- \in C_i^-}\|y - Hx^-\|^2\right\}$$

In Equation (5), $b_i$ denotes an i-th bit. $P(b_i=+1|y)$ denotes a probability of the i-th bit being '+1' when the receive signal vector y is received, and $P(b_i=+1)$ denotes a probability of the i-th bit being '+1'. $C_i^+$ denotes the set of x's when the i-th bit of the transmit signal vector x is '+1', and $C_i^-$ denotes the set of x's when the i-th bit of the transmit signal vector x is '−1'. As one can see from Equation (5), since the LLR computation at the ML receiver has to calculate the Euclidean distance with respect to every combination of the transmit signal vector x, it is difficult to adopt it for the greater number of antennas or the high-level modulation scheme.

As discussed above, when using the SM scheme, what is demanded is a receiver structure which has low complexity and high reliability similar to the LLR of the ML.

SUMMARY OF THE INVENTION

An aspect of the present invention is to substantially solve at least the above problems and/or disadvantages and to provide at least the advantages below. Accordingly, an aspect of the present invention is to provide a receiving apparatus and method of generating a Log-Likelihood Ratio (LLR) with high reliability in a system using a Spatial Multiplexing (SM) scheme.

Another aspect of the present invention is to provide a receiving apparatus and method which has low complexity and shows the performance similar to a Maximum Likelihood (ML) scheme in a system using the SM scheme.

The above aspects are achieved by providing a receiver in a communication system using a SM scheme, the receiver including a multiple input multiple output (MIMO) detector which generates at least one estimated transmit vector by demodulating a receive vector using at least one MIMO detection process; a reliability predictor which calculates a weight to be applied to each of elements constructing the at least one estimated transmit vector; and a LLR generator which calculates LLRs by selecting an optimum estimated transmit vector from the at least one estimated transmit vector generated at the MIMO detector, multiplies the calculated LLRs by the weight calculated at the reliability predictor, and outputs the product.

According to one aspect of the present invention, a reception method in a communication system using a spatial multiplexing scheme includes acquiring at least one estimated transmit vector by demodulating a receive vector using at least one MIMO detection process; selecting one of the estimated transmit vectors as an optimum estimated transmit vector; calculating LLRs with respect to the optimum estimated transmit vector; calculating a weight to be applied to each of elements constructing the optimum estimated transmit vector; and applying the weight to each of the calculated LLRs.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinbelow, descriptions explain a receiver and method of generating a Log-Likelihood Ratio (LLR) with high reliability in a system using a Spatial Multiplexing (SM) scheme according to the present invention.

FIG. 1 shows a transmitter and a receiver in a Multiple Input Multiple Output (MIMO) antenna according to the present invention. The transmitter includes a channel encoder 100, an interleaver 110, a modulator 120, a demultiplexer (DEMUX) 130, and a plurality of transmit antennas 140-1 through 140-$N_T$. The receiver includes a plurality of receive antennas 150-1 through 150-$N_R$, a MIMO demodulator 160, a deinterleaver 170, and a channel decoder 180.

In the transmitter, the channel encoder 100 outputs encoded symbols by coding information bit streams to be transmitted at a given coding rate. When the number of the input information bits is k and the coding rate is R, the number of the output symbols is k/R. By way of example, the channel encoder 100 can employ a convolutional encoder, a turbo encoder, a Low Density Parity Check (LDPC) encoder, and the like.

The interleaver 110 interleaves and outputs the symbols from the channel encoder 100 according to an interleaving rule to make them robust to burst error.

The modulator 120 modulates and outputs the symbols interleaved at the interleaver 110 using a certain modulation scheme. In other words, the modulator 120 outputs a complex signal by mapping signal points into a constellation according to a certain mapping scheme. For instance, the modulation schemes include Binary Phase Shift Keying (BPSK) which maps one bits (s=1) to one complex signal, Quadrature Phase Shift Keying (QPSK) which maps two bits (s=2) to one complex signal, 8-ary Quadrature Amplitude Modulation (8QAM) which maps three bits (s=3) to one complex signal, and 16QAM which maps four bits (s=4) to one complex signal.

The DEMUX 130 demultiplexes the complex signals fed from the modulator 120 and transmits them on the $N_T$-ary transmit antennas. Although not show in the drawings, for instance, when using an Orthogonal Frequency Division Multiplexing (OFDM) communication scheme, the plurality of the streams output from the DEMUX 130 are OFDM-modulated and the OFDM-modulated signal is transmitted over the corresponding antenna by air after passing through Radio Frequency (RF) processing to enable transmission by air. It is assumed that the transmit vector transmitted on the plurality of the transmit antennas 140-1 through 140-$N_T$ is $x=[x_1, x_2, \ldots, x_{N_T}]$.

Next, in the receiver, the plurality of the receive antennas 150-1 through 150-$N_R$ receives the signals transmitted from the plurality of the transmit antennas 140-1 through 140-$N_T$. Although not shown in the drawing, the RF signals received through the receive antennas 150-1 through 150-$N_R$ are converted to baseband sample data, respectively. The sample data is OFDM-demodulated and then fed to the MIMO demodulator 160. It is assumed that the receive vector input to the MIMO demodulator 160 is $y=[y_1, y_2, \ldots, y_{N_R}]$.

product. Operation of the MIMO demodulator 160 will be described by referring to FIG. 2.

The deinterleaver 170 deinterleaves and outputs the LLRs fed from the MIMO demodulator 160 according to a given rule. The channel decoder 180 restores the information bit streams by soft-decision decoding the LLRs from the deinterleaver 170.

Figure 2:
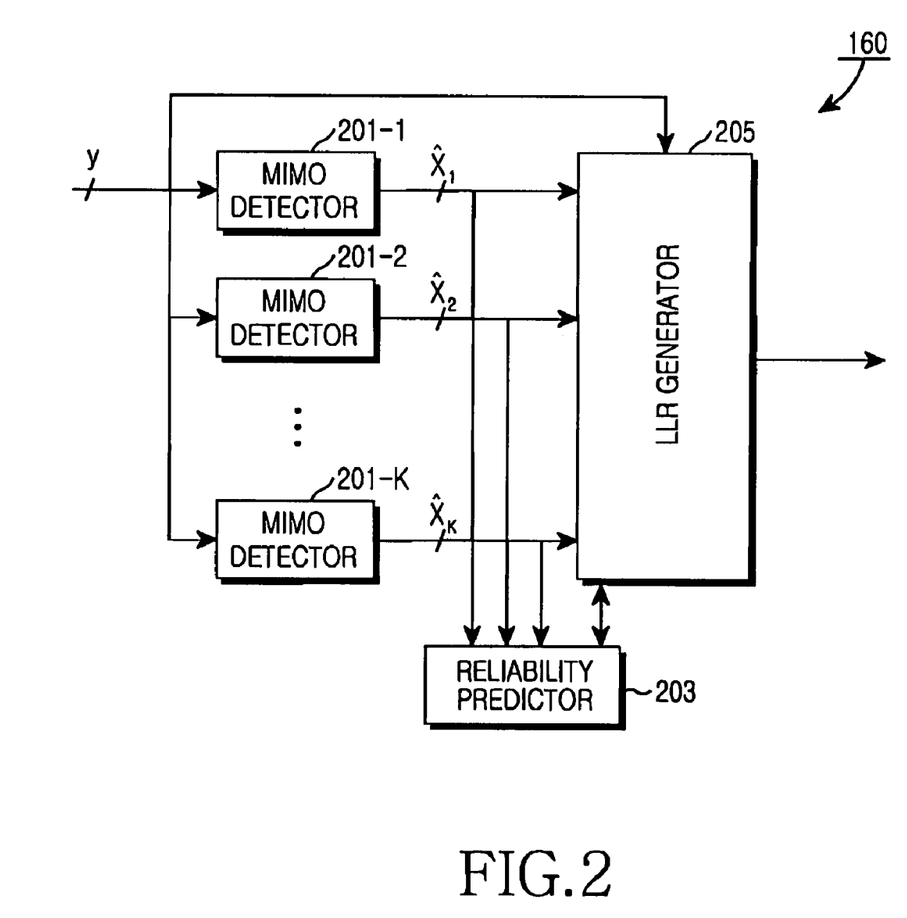
FIG. 2 illustrates a detail configuration of the MIMO demodulator of FIG. 1.

As shown in FIG. 2, the MIMO demodulator 160 includes a plurality (K-ary) of MIMO detectors 201-1 through 201-K, a reliability predictor 203, and an LLR generator 205.

The plurality of the MIMO detectors 201-1 through 201-K generates one or more estimated vectors (transmit vectors) by demodulating a receive vector y using different MIMO detection schemes. For instance, the MIMO detectors can be configured by differently applying a detection order in the MMSE-OSIC (Ordered SIC) process. In addition, an ascending part and a descending part detected in the Sorted MML can construct two different MIMO detectors. Likewise, it is assumed that the MIMO detectors 201-1 through 201-K are constructed using a variety of present or future MIMO detection processes. It is assumed that the estimated vectors output from the MIMO detectors 201-1 through 201-K are $\hat{x}_1, \hat{x}_2, \ldots, \hat{x}_K$.

The reliability predictor 203 predicts a reliability with respect to each of elements (estimated symbols) constructing an optimum estimated vector, and calculates and outputs a weight to multiply by each of the elements (symbols). In doing so, a high weight is applied to a high-reliability element (symbol) and a low weight is applied to a low-reliability symbol. Equation (6) expresses a simple example of the weight generated at the reliability predictor 203.

and outputs a weight to multiply by each of the elements (symbols). In doing so, a high weight is applied to a high-reliability element (symbol) and a low weight is applied to a low-reliability symbol. Equation (6) expresses a simple example of the weight generated at the reliability predictor 203.

$$w_n = \begin{cases} 1, & \text{when } \tilde{x}_n^{(opt)} = \tilde{x}_n^{(1)} = \ldots = \tilde{x}_n^{(K)} \\ 0, & \text{otherwise} \end{cases} \quad (6)$$

In Equation (6), $\tilde{x}_n^{(k)}$ denotes an n-th element of an k-th estimated vector $\tilde{x}_k$. That is, when the elements at the same position in every estimated vector have the equal value, the weight for the elements is set to '1'. Otherwise, the weight is set to '0'.

Equation (7) expresses another example of the weight generated at the reliability predictor 203.

$$w_n = \frac{\text{number of the same symbol}}{K} \text{ with } \tilde{x}_n^{(opt)} \text{ among}\{\tilde{x}_n^{(k)} \mid k = 1, 2, \ldots, K\} \quad (7)$$

In Equation (7), the weight can be interpreted as the probability that the n-th element of the K-ary estimated vectors is the same as the n-th element of $\tilde{x}_{opt}$ (the optimum vector selected from the estimated vectors). This can be interpreted as the reliability when the n-th element (or the estimated symbol) $\tilde{x}_n^{(opt)}$ is the symbol that is correctly determined.

Meanwhile, the LLR generator 205 generates LLRs by selecting the optimum estimated vector from the K-ary estimated vectors of the MIMO detectors 201-1 through 201-K, multiplies the generated LLRs by the weight acquired at the reliability predictor 203, and outputs the product. Operation of the LLR generator 205 will be explained by referring to FIG. 3.

Figure 3:
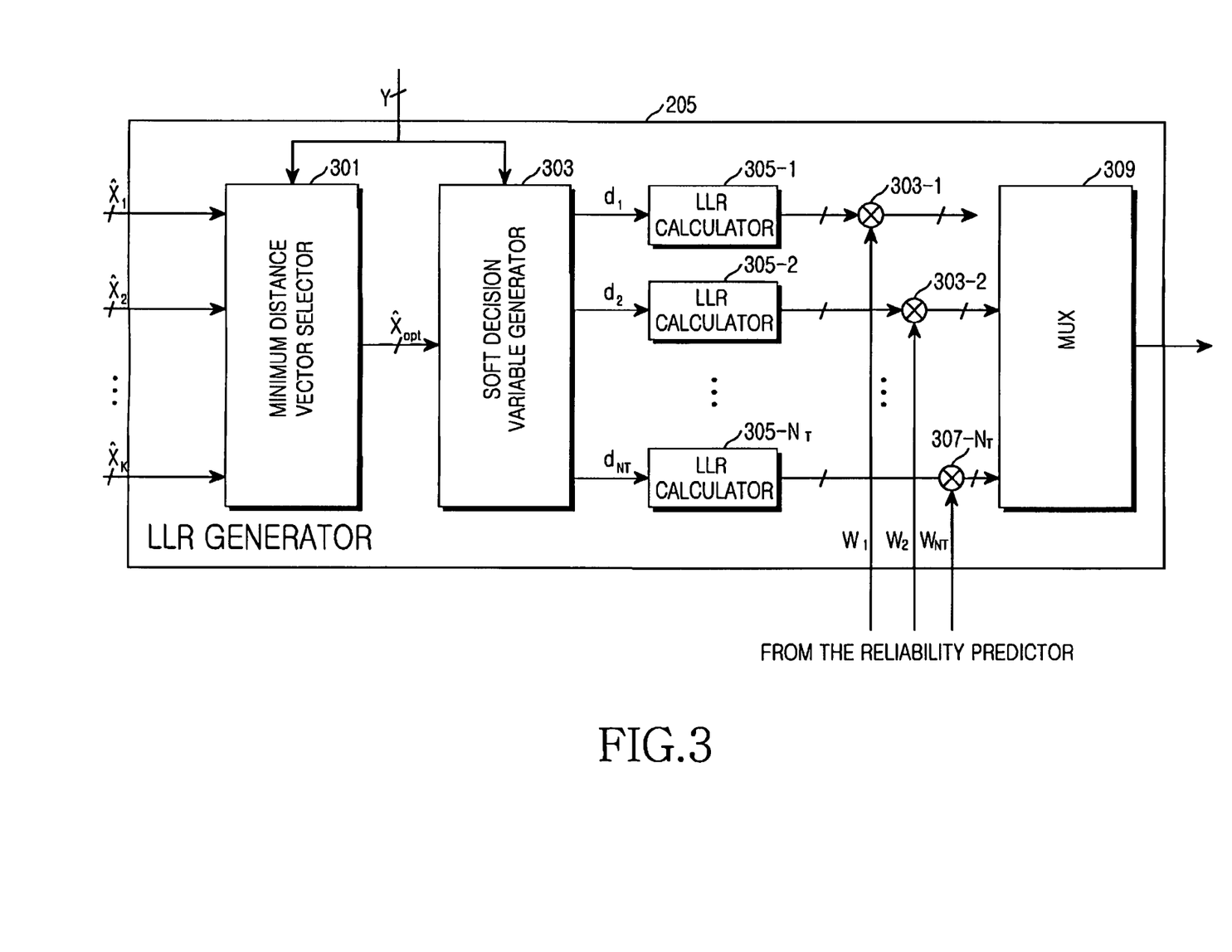
FIG. 3 illustrates a detail configuration of the LLR generator of FIG. 2.

The LLR generator 205 according to the present invention includes a minimum distance vector selector 301, a soft decision variable generator 303, a plurality of LLR calculators 305-1 through 305-$N_T$, a plurality of multipliers 307-1 through 307-$N_T$, and a multiplexer (MUX) 309.

The minimum distance vector selector 301 calculates the Euclidean distance between the K-ary estimated vectors ($\hat{x}_1$, $\hat{x}_2$ ..., $\hat{x}_K$) from the MIMO detectors 201-1 through 201-K and the receive vector y, respectively, selects and outputs an optimum estimated vector $\tilde{x}_{opt}$ corresponding to the minimum Euclidean distance. The modeling of the operation of the minimum distance vector selector 301 is expressed as in Equation (8) below.

$$\tilde{x}_{opt} = \underset{\tilde{x}_k}{\text{argmin}} \|y - H\tilde{x}_k\|, k = 1, 2, \ldots, K \quad (8)$$

The soft decision variable generator 303 computes and outputs a soft decision variable for each estimated symbol with respect to the optimum estimated vector $\tilde{x}_{opt}$ fed from the minimum distance vector selector 301 based on the following Equation (9).

$$d_n = h_n^H \cdot \left( y - \sum_{i=1, i \neq n}^{N_T} h_i \tilde{x}_i^{(opt)} \right) \quad (9)$$

In Equation (9), $d_n$ denotes the soft decision variable corresponding to the transmit symbol of the n-th transmit antenna, $h_n$ denotes the n-th column vector of the channel coefficient matrix H, and $\tilde{x}_i^{(opt)}$ denotes the i-th element of $\tilde{x}_{opt}$.

Since the calculated soft decision variable is a scalar value, rather than a vector, the LLR can be acquired using the LLR calculation process of the well-known Single Input Single Output (SISO) system.

Figure 5:
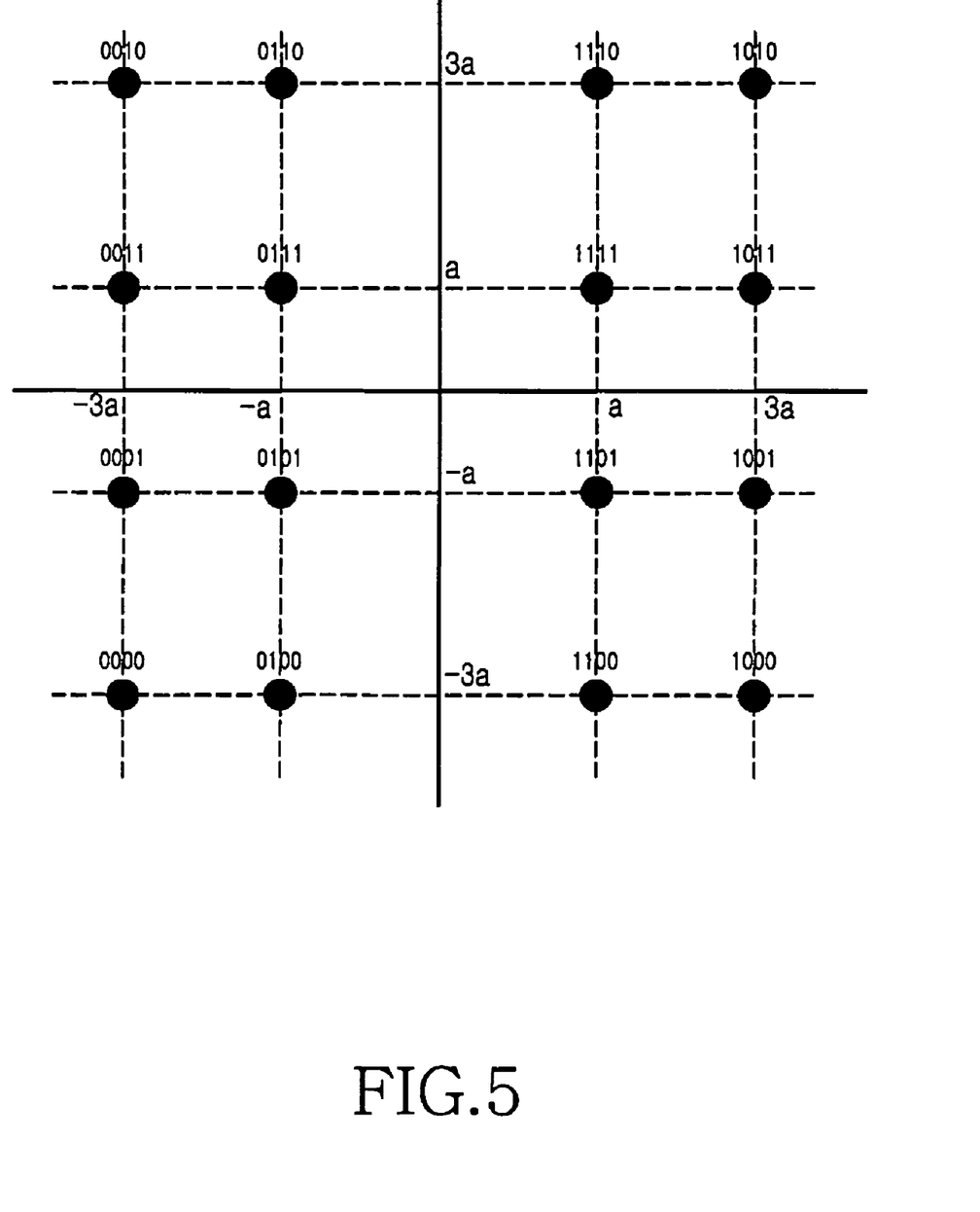
FIG. 5 illustrates a 16QAM constellation according to the present invention.

Accordingly, the LLR calculators 305-1 through 305-$N_T$ calculate and output the LLR with respect to each of the encoded symbols (bits) mapped to one signal point using the input soft decision variable $d_n$, respectively. In case of the 16QAM as shown in FIG. 5, the LLR calculation process of the SISO system can be defined as in Equation (10) below.

$$LLR(b_{n,1}) = \frac{4a\|h_n\|^2}{2\sigma^2} \begin{cases} \text{real}(d'_n), & \text{when}|\text{real}(d'_n)| \leq 2a \\ 2(\text{real}(d'_n) - a), & \text{when}|\text{real}(d'_n)| > 2a \\ 2(\text{real}(d'_n) + a), & \text{when}|\text{real}(d'_n)| < -2a \end{cases} \quad (10)$$

$$LLR(b_{n,2}) = \frac{4a\|h_n\|^2}{2\sigma^2}(2a - |\text{real}(d'_n)|)$$

$$LLR(b_{n,3}) = \frac{4a\|h_n\|^2}{2\sigma^2} \begin{cases} \text{image}(d'_n), & \text{when}|\text{image}(d'_n)| \leq 2a \\ 2(\text{image}(d'_n) - a), & \text{when}|\text{image}(d'_n)| > 2a \\ 2(\text{image}(d'_n) + a), & \text{when}|\text{image}(d'_n)| < -2a \end{cases}$$

$$LLR(b_{n,4}) = \frac{4a\|h_n\|^2}{2\sigma^2}(2a - |\text{image}(d'_n)|)$$

In Equation (10), $b_{n,i}$ denotes the i-th encoded symbol of the n-th transmit antenna, real($d'_n$) denotes the real component, and image($d'_n$) denotes the imaginary component. $d'_n$ is expressed as in Equation (11) below.

$$d'_n = \frac{d_n}{\|h_n\|^2} \quad (11)$$

In other words, the LLR calculators 305-1 through 305-$N_T$ calculate and output log$_2$(M)-ary LLRs corresponding to the n-th transmit antenna, respectively.

The plurality of the multipliers 307-1 through 307-$N_T$ multiplies the LLR from the corresponding LLR generator by the weight from the reliability predictor 203, and outputs its product.

The MUX 309 converts the LLRs weighted at the multipliers 307-1 through 307-$N_T$ to serial data and outputs the serial data to the deinterleaver 170.

Figure 4:
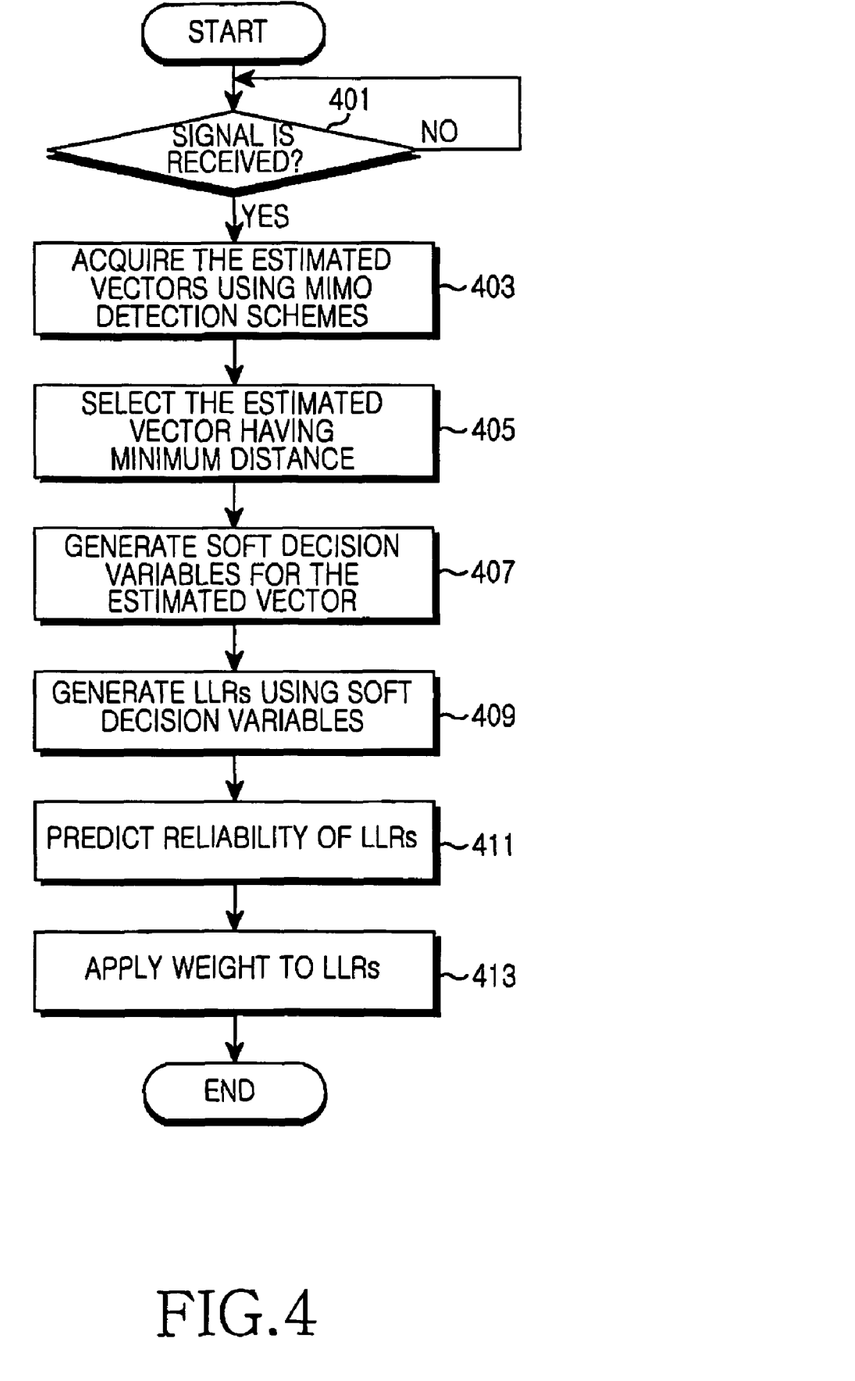
FIG. 4 illustrates a procedure of generating LLRs fed to the channel decoder in the MIMO antenna system according to the present invention.

FIG. 4 shows a procedure of generating LLRs fed to the channel decoder in the MIMO antenna system according to the present invention. The receiver checks whether a signal is received in step 401. When the signal is received, the receiver acquires a plurality of estimated vectors (transmit vectors) by demodulating the receive vector y using a plurality of MIMO detection processes in step 403. Note that the use of the different MIMO detection processes does not always imply that the estimated vectors $\hat{x}_1, \hat{x}_2, \ldots, \hat{x}_K$ are different from one another.

After acquiring the plurality of the estimated vectors, the receiver calculates the Euclidean distances between the receive vector y and the estimated vectors and selects an estimated vector having the minimum Euclidean distance in step 405.

Next, the receiver generates a soft decision variable for each element constructing the selected vector $\tilde{x}_{opt}$ in step 407.

The soft decision variable corresponding to the transmit symbol of the n-th transmit antenna can be calculated based on Equation (9).

As such, after generating the soft decision variable for each of the elements constructing the estimated vector, the receiver generates $\log_2(M)$-ary LLRs corresponding to the relevant transmit antennas using the soft decision values in step 409. In doing so, the receiver generates the LLRs using the LLR calculation process of the SISO system.

In the mean time, the receiver predicts the reliability of the generated LLRs and calculates a weight to be applied to each LLR according to its predicted reliability in step 411. The weight can be acquired using the plurality of the estimated vectors generated using the MIMO detection processes as explained in connection with Equations (6) and (7).

After calculating the weight to be applied to each LLR, the receiver multiplies the LLRs to be fed to the channel decoder by the weights, respectively in step 413 and then terminates the process of the present invention.

The present invention generates a plurality of the estimated vectors using a plurality of the MIMO detection processes and applies an LLR generation method to one of the estimated vectors. However, according to the present invention, one estimated vector can be generated using one MIMO detection process and an LLR generation method can be applied to the estimated vector. Since the suggested reliability prediction (weight calculation) method of the present invention is not applicable, the weight for the LLR is calculated using the channel coefficient matrix (H) by way of example.

Figure 6:
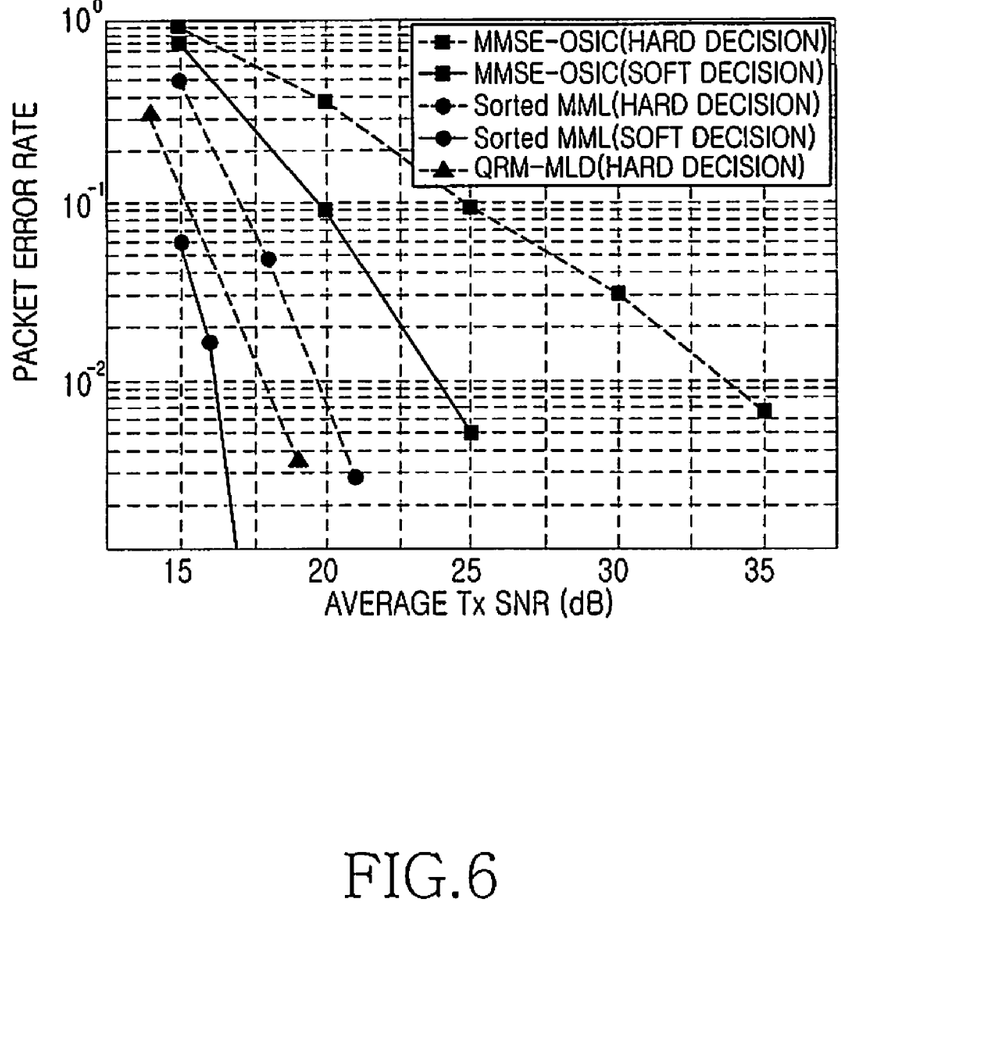
FIG. 6 is a graph comparing a packet error rate of various MIMO reception processes.

FIG. 6 is a graph comparing a packet error rate of various MIMO reception processes. A link-level simulation is conducted and the performance is compared using the Packet Error Rate (PER). It is assumed that the number of the transmit/receive antennas is four, respectively, the OFDM system has 64 sub-carriers, and that the transmit channel environment is a 9 tap frequency selective channel without correlation. In addition, a packet consists of 10240 bits (10 OFDM symbols) and the 16QAM modulation scheme is adopted.

As shown in FIG. 6, the performance is compared among MMSE-OSIC, Sorted MML, and QRM-MLD (QR decomposition and the M-algorithm—Maximum Likelihood Detection) of NTT-DoCoMo (a Jananese telecommunication company).

The suggested LLR generation method of the present invention is applied only to the Sorted MML and the weight is defined as in Equation (12) below.

$$w_n = \begin{cases} 1, & \text{when } x_{AS} = x_{DS} \\ 1/8, & \text{otherwise} \end{cases} \quad (12)$$

In Equation (12), $x_{AS}$ and $x_{DS}$ denote a decision value of the branch detected in an ascending order and an descending order of the Sorted MML, respectively, and the value ⅛ is an optimum value acquired from the experiment.

As one can see from the graph, at 1% Packet Error Rate (PER), the present invention (Sorted MML (soft decision)) has about a 4.0 dB gain, comparing to the related art (Sorted MML (hard decision)) using the hard decision. In comparison to the soft decision of the QRM-MLD scheme, the present invention exhibits the performance enhanced by about 2.0 dB. In comparison to the soft decision of MMSE-OSIC which is generally known as the simple MIMO reception process, the present invention exhibits a performance enhancement by about 7.5 dB.

In light of the forgoing as set forth above, the present invention can generate the LLRs with the high reliability similar to the LLRs of the ML receiver by applying a weight to the LLRs generated from a transmit vector estimated in a system using an SM scheme.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A receiver in a communication system using a spatial multiplexing scheme, the receiver comprising:
    a Multiple Input Multiple Output (MIMO) detector which generates at least one estimated transmit vector by demodulating a receive vector using at least one MIMO detection process;
    a reliability predictor which calculates a weight to be applied to each of elements constructing the at least one estimated transmit vector; and
    a Log-Likelihood Ratio (LLR) generator which calculates LLRs by selecting an optimum estimated transmit vector from the at least one estimated transmit vector generated at the MIMO detector, multiplies the calculated LLRs by the weight calculated at the reliability predictor, and outputs a product.

2. The receiver of claim 1, wherein the reliability predictor calculates the weight using the at least one estimated transmit vector.

3. The receiver of claim 1, wherein the reliability predictor calculates a weight to be applied to an n-th element using a number of estimated transmit vectors having the n-th element which is the same as an n-th element of the optimum estimated transmit vector.

4. The receiver of claim 1, wherein the reliability predictor calculates the weight using a channel coefficient matrix.

5. The receiver of claim 1, wherein the LLR generator comprises:
    a vector selector which calculates distances between the at least one estimated transmit vector generated at the MIMO detector and the receive vector, respectively, and selects and outputs an estimated transmit vector having a minimum distance as the optimum estimated transmit vector;
    a calculator which calculates an LLR with respect to each of elements constructing the optimum estimated transmit vector selected at the vector selector; and
    a multiplier which multiplies each of the LLRs calculated at the calculator by the weight calculated at the reliability predictor.

6. The receiver of claim 5, wherein the calculator comprises:
    a variable generator which generates a soft decision variable with respect to each of the elements constructing the optimum estimated transmit vector selected at the vector selector; and
    an LLR calculator which calculates an LLR with respect to each of encoded symbols by executing an LLR calculation process with the soft decision variables generated at the variable generator.

7. The receiver of claim 6, wherein the soft decision variable is calculated based on the following equation:

$$d_n = h_n^H \cdot \left( y - \sum_{i=1, i \neq n}^{N_T} h_i \tilde{x}_i^{(opt)} \right)$$

where $d_n$ denotes a soft decision variable corresponding to a transmit symbol of an n-th transmit antenna, $h_n$ denotes an n-th column vector of a channel coefficient matrix H, and $\tilde{x}_i^{(opt)}$ denotes an i-th element of the optimum estimated transmit vector $\tilde{x}_{opt}$.

8. The receiver of claim 6, wherein the LLR calculator calculates the LLRs using an LLR calculation process of a single input and single output (SISO) system.

9. The receiver of claim 1, further comprising:
a deinterleaver which deinterleaves and outputs LLRs to which the weight calculated at the multiplier is applied; and
a channel decoder which restores information bit streams by soft-decision decoding the LLRs output from the deinterleaver.

10. A reception method in a communication system using a spatial multiplexing scheme, the method comprising:
acquiring at least one estimated transmit vector by demodulating a receive vector using at least one Multiple Input Multiple Output (MIMO) detection process;
selecting one of the estimated transmit vectors as an optimum estimated transmit vector;
calculating Log-Likelihood Ratios (LLRs) with respect to the optimum estimated transmit vector;
calculating a weight to be applied to each of elements constructing the optimum estimated transmit vector; and
applying the weight to each of the calculated LLRs.

11. The reception method of claim 10, wherein the weight is calculated using the at least one estimated transmit vector.

12. The reception method of claim 10, wherein a weight to be applied to an n-th element is calculated using a number of estimated transmit vectors having the n-th element which is the same as an n-th element of the optimum estimated transmit vector.

13. The reception method of claim 10, wherein the weight is calculated using a channel coefficient matrix.

14. The reception method of claim 10, wherein the selecting step comprises:
calculating distances between the at least one estimated transmit vector and the receive vector, respectively; and
selecting an estimated transmit vector having a minimum distance among the calculated distances as the optimum estimated transmit vector.

15. The reception method of claim 10, wherein the calculating LLR step comprises:
generating a soft decision variable with respect to each of the elements constructing the optimum estimated transmit vector; and
generating an LLR with respect to each of encoded symbols by applying an LLR calculation process to each of the soft decision variables.

16. The reception method of claim 15, wherein the soft decision variable is calculated based on the following equation:

$$d_n = h_n^H \cdot \left( y - \sum_{i=1, i \neq n}^{N_T} h_i \tilde{x}_i^{(opt)} \right)$$

where $d_n$ denotes a soft decision variable corresponding to a transmit symbol of an n-th transmit antenna, $h_n$ denotes an n-th column vector of a channel coefficient matrix H, and $\tilde{x}_i^{(opt)}$ denotes an i-th element of the optimum estimated transmit vector $\tilde{x}_{opt}$.

17. The reception method of claim 10, further comprising:
deinterleaving and outputting LLRs to which the weight is applied; and
restoring information bit streams by soft-decision decoding the deinterleaved LLRs.

* * * * *